United States Patent [19]

Zeltner et al.

[11] 4,430,829
[45] Feb. 14, 1984

[54] MOISTURE CONTROL APPARATUS

[75] Inventors: Bernard Zeltner, Aix en Provence; Gaston Marmonnier, Marseille, both of France

[73] Assignee: Manufacture Provençale de Matieres Plastiques, Marseille, France

[21] Appl. No.: 341,887

[22] Filed: Jan. 22, 1982

[30] Foreign Application Priority Data

Apr. 3, 1981 [FR] France ............................... 81 06906

[51] Int. Cl.³ .............................................. A01G 9/02
[52] U.S. Cl. ..................................................... 47/81
[58] Field of Search ................................ 47/79, 80, 81

[56] References Cited

U.S. PATENT DOCUMENTS

| | | | |
|---|---|---|---|
| 2,445,717 | 7/1948 | Richards | 47/80 |
| 2,651,884 | 9/1953 | Werner | 47/80 |
| 3,117,442 | 1/1964 | Brooks | 47/79 X |
| 3,261,125 | 7/1966 | Arkebauer | 47/81 |
| 3,512,712 | 5/1970 | Benesch | 47/81 X |

FOREIGN PATENT DOCUMENTS 2393528 9/1979 France .................................. 47/80

Primary Examiner—James R. Feyrer
Assistant Examiner—Danton DeMille
Attorney, Agent, or Firm—R. J. Austin

[57] ABSTRACT

Apparatus for controlling moisture content in soil having a first fabric to be immersed in a water reservoir and to move into and out of contact with a second fabric to transfer moisture to the second fabric and then to an absorbent fabric underlying the soil. Movement of the first fabric into and out of contact with the second fabric to control moisture content in the soil is controlled by a lever which hangs downwardly from a pivot and holds the first fabric at its lower end. The lever is urged in one direction to break contact between the first and second fabrics, by a biassing means. It is urged in the other direction to renew the contact by the pulling action of a moisture-responsive stretchable and shrinkable material which shrinks during drying of the upper regions of soil and so creates the pulling force.

22 Claims, 5 Drawing Figures

MOISTURE CONTROL APPARATUS

This invention relates to moisture control apparatus for plant containers.

As is well known, a basic plant container is a simple pot which holds a plant in a particulate growing material or humus. These materials will be referred to generally throughout this specification as "soil".

For many uses, the simple pot is sufficient for the growing and cultivation of plants. However, many forms of plant life, e.g. those commonly referred to as "indoor" plants, need to be cultivated in specific ambient temperature ranges because they originate from tropical environments and are grown as indoor plants in temperate zones. Furthermore, many plants, such as some indoor plants, may only be cultivated properly if the moisture content of the surrounding soil is maintained between preset limits. For such plants, the basic plant container or pot is inadequate because the moisture content is adjusted manually. It is known that where there is a human responsible for adding moisture directly to the soil, resultant extremely dry or extremely wet conditions and haphazard watering often cause plants to die.

To overcome the above problem, plant containers have been constructed having reservoirs for water above which soil supports are disposed, the soil supports being spaced from the water. A water absorbent fabric carried by the support contacts the soil and has a portion which hangs into the water. By absorbent or capillary action, water is raised from the reservoir up the hanging portion of the fabric, into the fabric in contact with the soil, and then into the soil. This construction thus avoids the need for constant rewatering as the fabric passes water into the soil and thence to plant roots through the soil base. To ensure this action may take place, it is simply necessary for the reservoir of water to be maintained by examination at infrequent intervals.

Theoretically, the use of a water absorbent fabric in this way ensures that moisture is always present in the soil. Unfortunately, without a control being placed upon the rate at which water is raised from the reservoir, it may be found that the soil becomes too moist for proper and healthy cultivation of some plants.

Attempts have been made to overcome the latter problem with minimal success. Until the present, any mechanism which has been designed to control the degree of moisture in the soil has been complex in construction and operation. It has also been unreliable because it involved the automatic raising and lowering of fabric into and out of the reservoir of water as the weight of the movable parts created problems in the correct operation of the mechanism.

The present invention concerns an apparatus for controlling moisture content in soil wherein the above disadvantages are avoided so as to enable the apparatus to operate efficiently and as required.

Accordingly, the present invention provides apparatus for controlling moisture content in soil in a plant container comprising:

a housing having a lower region defining a first opening and a side defining a second opening located upwardly from the first opening;

a moisture feed and feed interruption device comprising a lever pivotally mounted at a pivotal position within the housing and depending from the pivotal position towards the lower region to enable a first water absorbent fabric carried by the lever to extend through the first opening and project from the housing, the lever being pivotally movable to move part of the first fabric into and out of contact with a second water absorbent fabric to transfer water from the first fabric to the second fabric and through the second opening to the outside of the housing, the lever having a biassing means to pivotally urge the lever in one direction to move the first fabric out of contact with the second fabric; and a moisture detection and moisture control means comprising:

(a) a moisture-responsive, stretchable and shrinkable material which stretches when in contact with moisture and shrinks during drying, the material contained within the housing and extending between one location at which it is anchored and another location at which it coacts with the lever to pivot the lever in the other direction and against the urgency of the biassing means, and thus move the first fabric into contact with the second fabric as the material shrinks;

(b) a moisture-transfer absorbent fabric having a first part open to the interior of the housing in the vicinity of the material and a second part depending from said first part and from the housing to transfer moisture upwardly to said first part and into the housing in the vicinity of the material.

In the apparatus defined above, the moisture responsive material may respond to the degree of moisture surrounding it in the housing whereby direct contact between the moisture transfer fabric and the material may be unnecessary. Alternatively, there may be direct contact and moisture is then transferred directly into the moisture responsive material.

In a preferred arrangement, the housing comprises a vertical part and a transverse part extending outwardly from an upper region of the vertical part. In this arrangement, the lever lies within the vertical part and the stretchable and shrinkable material is located within the transverse housing part.

In use, the apparatus operates inside a plant container with a base and open top, the container including a water distributing soil support comprising a fabric support structure carrying a water-absorbent water distribution fabric, the soil support disposed substantially horizontally within the container and above the base to carry weight of soil and to separate the soil from a water reservoir located beneath the support. In this container, the apparatus extends downwardly and past the support to:

(a) locate the lower region of the housing within the water reservoir and the first opening located below a desired upper water level;

(b) locate the second fabric in permanent water-transferring contact with the distribution fabric; and (c) locate the moisture transfer fabric depending from the housing to a position beneath the desired upper level of the soil.

When the apparatus is according to the preferred arrangement, the vertical part of the housing extends downwardly into the reservoir and the transverse part extends from the vertical part and over the upper level of the soil.

With apparatus according to the invention, the number of moving parts is reduced to a minimum, i.e. the lever, and because of the construction, weight does not create a problem. In particular, the lever does not raise the first fabric to move it into and out of contact with the second fabric, but merely pivots to move the first fabric beneath the pivotal position.

Two embodiments of the invention will now be described with reference to the accompanying drawings, in which.

Figure 1:
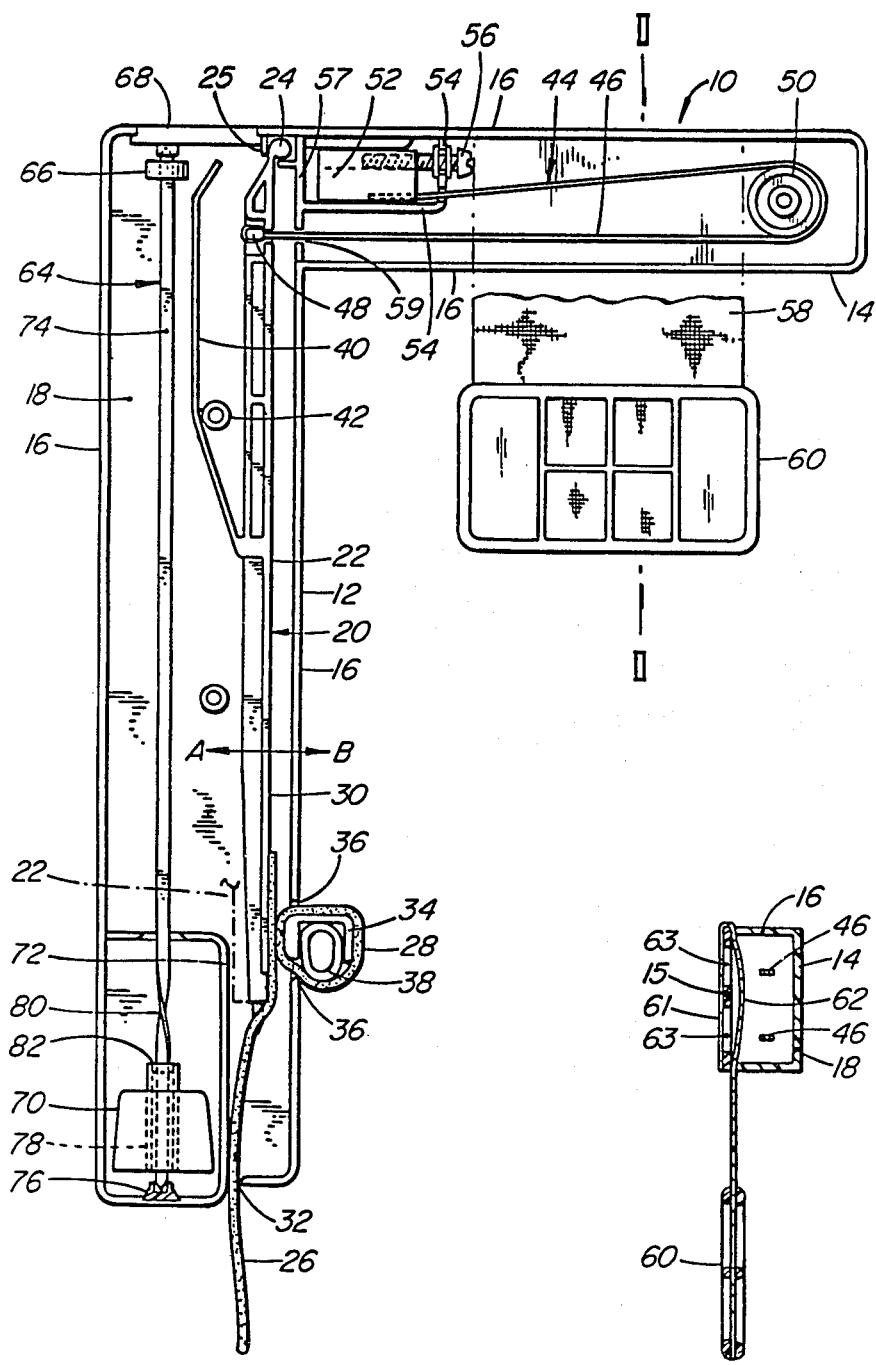
FIG. 1 is a side elevational view of apparatus according to a first embodiment.

As shown by FIG. 1, apparatus 10 according to a first embodiment comprises a housing having a vertical housing part 12 and transverse or horizontal housing part 14. The transverse housing part extends outwardly from an upper region of the vertical housing part and is integral with it, the housing being formed as a plastics moulding. The housing is formed with an open side which faces out from FIG. 1, this side being closed in the completely assembled housing by a cover plate 15 which is removed in FIG. 1 to show the working parts. Walls 16 of the housing extend from the open side to a closed side 18 as shown in the cross-section of FIG. 2. The overall width of the housing from the cover plate to the closed side is below 1.00 inch (2.54 cm).

The vertical housing part carries a moisture feed and feed interruption device 20 within it. This device comprises a lever 22 having a cylindrical upper end 24 which acts as a pivot pin and which is freely held at the top of the vertical housing part by housing wall portions 25. The lever hangs from the upper end 24 towards a lower region of the vertical housing portion and is pivotable in the directions of arrows 'A' and 'B' in FIG. 1 about the upper end.

The device 20 also includes first and second water absorbent fabrics 26 and 28. The first fabric 26 is a felt which extends alongside and is stuck to one flat side surface 30 of the lever at a lower end portion of the lever. The first fabric 26 hangs downwards and passes through a first opening 32 formed in the lower region, i.e. at the base of the vertical housing part 12, to project outwardly from the housing as shown by FIG. 1.

The second fabric 28 is in the form of annular felt which surrounds an inverted 'U'-shaped part 34 of the housing which juts forwardly from the closed side 18 of the housing as shown by FIG. 1, the part 34 forming two openings 36 in one side 16 to allow the fabric 28 to face into the housing. A resilient rubber 'O'-ring 38 held within the U-shaped part 34 projects downwards to apply pressure to the fabric 28, as shown, and hold it tightly around part 34.

A biassing means is provided to pivotally urge the lever in the direction of arrow 'A', i.e. away from the fabric 28. This biassing means comprises a cantilever leaf spring 40 which is integral with the lever 22, the spring extending outwardly and upwardly from a central region of the lever. The spring acts against a pin 42 integral with the housing side wall 18 and projecting forwardly towards the open side of the housing.

The relationship of the first and second fabrics is such that when the lever 22 is moved in the direction of arrow 'B', the part of the first fabric 26 secured to the lever, is pressed against the second fabric by the lever as shown in FIG. 1. Also, the 'U'-shaped housing part 34 acts as an abutment to hold the second fabric part facing into the housing whereby the two fabrics are held positively together.

The transverse housing part carries a moisture detection and moisture control means 44. This comprises a moisture-responsive, stretchable and shrinkable material in the form of a woven ribbon 46 of polyamide filament. This ribbon stretches when in contact with moisture and shrinks during drying. One end of the ribbon is formed as a loop which surrounds a pin 48, formed integrally with the lever 22 at a position slightly below the upper end 24 of the lever. The ribbon extends laterally from the pin 48 and along the transverse housing part on a first flight and around a return member which is a roller 50 freely rotatable at the far end of the transverse housing part. A second or return flight of the ribbon overlies the first flight and terminates at the end of the transverse housing part near lever 22 in an anchorage means. This anchorage means comprises a plastic block 52 to which the ribbon is secured, the block being retained within a small chamber formed by internal housing walls 54. The anchorage means is adjustable toward and away from the roller 50 to alter tension on the ribbon, and a screw-threaded means in the form of a plastics screw 56 and passing through a wall 54 is used for the adjustment.

A partition 57 is moulded with the housing to lie between and separate the interior of the transverse housing part from that of the vertical housing part except for a narrow gap 59 which is only sufficient for passage of the ribbon 46 as it extends to the pin 48. This partition ensures that moisture present in the vertical housing from a water reservoir (to be discussed) does not pass into the interior of the transverse housing part and hence cannot cause extension of the ribbon 46.

Figure 2:
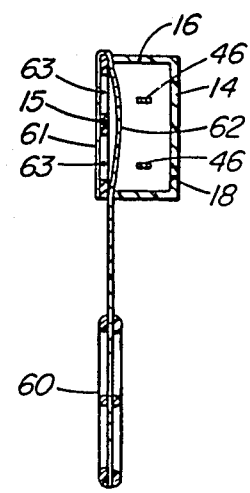
FIG. 2 is a cross-sectional view through the apparatus in FIG. 1 and along line II—II.

The moisture detection and moisture control means also comprises a moisture transfer fabric 58 which is in strip form. As shown by FIG. 2, this fabric is stuck at one end 61 to the outer surface of the cover plate 15. The fabric extends upwards and over the upper edge of the cover plate to hang downwards alongside the inner surface of the cover plate and then between the cover plate and a wall 16 to depend from the transverse housing part 14. As shown by FIG. 2, the part 62 of the fabric 58 which lies alongside the inner surface of the cover plate, is thus open to the interior of the transverse housing part 14 in the vicinity of the ribbon 46 and extends across the paths of both flights of the ribbon. The hanging end of the fabric 58 is provided with a relatively heavy element attached to it to hold it downwards. This element is a plastics moulding 60 which has been moulded onto the fabric to securely attach it thereto. It should be realized that as fabric 58 is attached to the cover plate, it is not present with the plate plate removed as represented by FIG. 1. The figure merely shows the position of the fabric in use.

As shown by FIG. 2, the cover plate 15 is formed with a plurality of holes 63 which lie in the area of plate covered by the fabric 58. These holes connect the ambient atmosphere with the interior of the housing in the vicinity of the ribbon to enable the ribbon and the fabric 58 to dry when water is not being absorbed up the fabric from its lower end.

The apparatus of the first embodiment is also provided with a water level indicator 64. This indicator comprises a visually readable gauge at the upper region of the vertical housing part. This gauge comprises a circular knob 66 which is open to view through a sight glass 68 forming a top part of the vertical housing part. The rotational position of the knob, clearly seen by a suitably multi-coloured upper surface, indicates to an observer, the water level in a reservoir of a plant container in which the apparatus is to be included. The rotational position of the knob is controlled by a float 70 located within the lower region of the vertical housing part and movable vertically upon change in the height of the water reservoir. The float is guided for movement by being held between a side wall 16 and an internal wall 72 of the housing. An operating means interconnects the float with the knob 66 to rotatably position the knob dependent upon the height of the float. The operating means comprises a flat-sided spindle 74 secured coaxially at its upper end to the knob and having a tapered lower end rotatably seated within a concave surface formed in a plastic seating pad 76 (shown in section) which is secured to the base wall of the vertical housing part. To effect rotation of the spindle and the knob by vertical movement of the float, the spindle passes through a centre passage 78 of the float and is helically twisted, as at 80, the helically twisted part being received in a complementary shaped slot 82 at the top of the passage 78.

Figure 3:
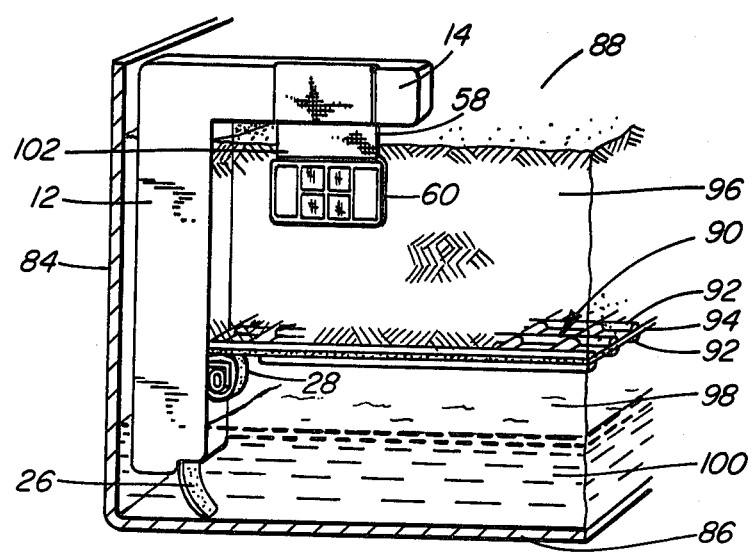
FIG. 3 is a vertical cross-sectional view through a plant container with the apparatus of FIG. 1 within the container.
Figure 4:
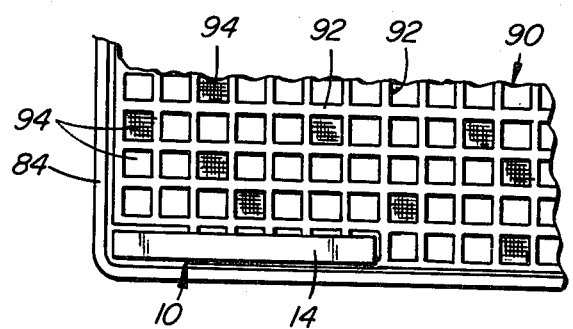
FIG. 4 is a plan view of the container and apparatus of FIG. 3.

In use, the apparatus 10 is installed within a plant container 84 as shown by FIGS. 3 and 4. The plant container comprises a base 86, open top 88 and a water distributing soil support 90. The support comprises a fabric support structure 92 formed of injection moulded plastics to form an open lattice arrangement (FIG. 4), and carrying a water absorbent water distribution fabric or sheet 94 of woven material. The sheet 94 may be supported upon the lattice of the support structure, but is preferably moulded within the structure during the moulding operation. As shown by FIG. 4, the sheet 94 extends across openings defined by the lattice of the support structure and is sufficiently inextensible to support the weight of soil 96 carried above the support. The soil support 90 is supported horizontally within the container and is spaced above the base to separate the soil 96 from a reservoir 98 for water 100 in the bottom of the container.

One corner region of the container walls and the support 90 define between them an opening which is complementary to the cross-sectional shape of the vertical housing part 12. The apparatus 10 is installed with the housing part 12 passing through this opening and with the lower region of the housing part located within the reservoir 98. In this position, the opening 32 in the lower region is below the water level whereby the fabric 26 hangs down into the water as shown by FIG. 3.

In the installed position of the apparatus 10, the fabric 28 is in permanent water-transferring contact with the distribution fabric or sheet 94. As shown in FIG. 3, the fabric 28 is disposed beneath the support 90 for this purpose, but it could, alternatively, be located above the support. Further, the transverse housing part extends across the upper level of the soil and the fabric 58 has its hanging end 102 extending beneath the soil level, within which it is held in positive fashion by the plastics moulding 60.

During use, with the fabric 26 hanging into the water 100, the water is absorbed upwardly into this fabric to its upper end. If the lever 22 is in a position moved in the direction of arrow 'B', as shown by FIG. 1, so that the first fabric 26 engages the second fabric 28, then the two fabrics are held positively together between the lever and the 'U'-shaped housing part 34. In this position, as indicated by FIG. 1, water is transferred from the first fabric to the second fabric 28 which in turn absorbs water. As the fabric 28 is in permanent engagement with the sheet 94, then the water is transferred into the sheet and it is absorbed across the whole sheet and from there into the lower regons of the soil.

The first and second fabrics are in water transferring contact when the woven ribbon 46 has shrunk during drying and has thus pulled the lever 22 in the direction of arrow 'B' to overcome the force of spring 40. Drying and shrinkage of the ribbon occur when moisture in the upper soil levels is insufficient to be transferred by the fabric 58 up into the vicinity of and into contact with ribbon 46. However, with the lever moved in direction 'B', moisture moves into the soil and then into its upper regions. Moisture is then absorbed by the fabric 58 and is transferred into the housing part 14 in the vicinity of the ribbon 46. The presence of the moisture causes the ribbon to stretch, thereby decreasing the pull of the ribbon upon the pin 48 until the force of spring 40 overcomes this pull and pivots the lever in the direction of arrow 'A'. This breaks the contact between the first and second fabrics 26 and 28 and in this position of the lever (shown in chain dotted outline in FIG. 1), no water is transferred from the reservoir into the sheet 94.

Eventually the ribbon 46 dries once more and thus results in a return of the lever 22 in the direction of arrow 'B', in the manner previously explained.

It is clear from the above description that the position of lever 22 as dictated by ribbon 46, controls the moisture content of the soil between specific upper and lower limits. If it is found that the moisture content is too great or too little for any particular plant being grown in the container, then the screw 56 is adjusted to alter the tension in the ribbon 46. Alterations of tension in the appropriate manner increase or decrease periods of contact between the fabrics 26 and 28 whereby the moisture content limits are changed as desired.

The position of float 70 is controlled by the water levle in reservoir 98. As the water level drops, this is shown by the position of knob 66 whereby more water may be added to the reservoir to return it to a desired level. For this purpose a feed tube (not shown) may extend down the inside of the container and through which water may be poured directly into the reservoir.

As is readily seen from the above embodiment, apparatus as described and according to the invention is simple in construction and operates easily and efficiently to control the moisture content in a plant container. Of importance is the fact that the operation avoids the raising and lowering of fabric together with its attendant unreliability partly caused because the fabric changes in weight between wet and dry conditions. With the apparatus described in the first embodiment, the operation of lever 22 is completely unaffected by the actual moisture content of the fabric 26.

Figure 5:
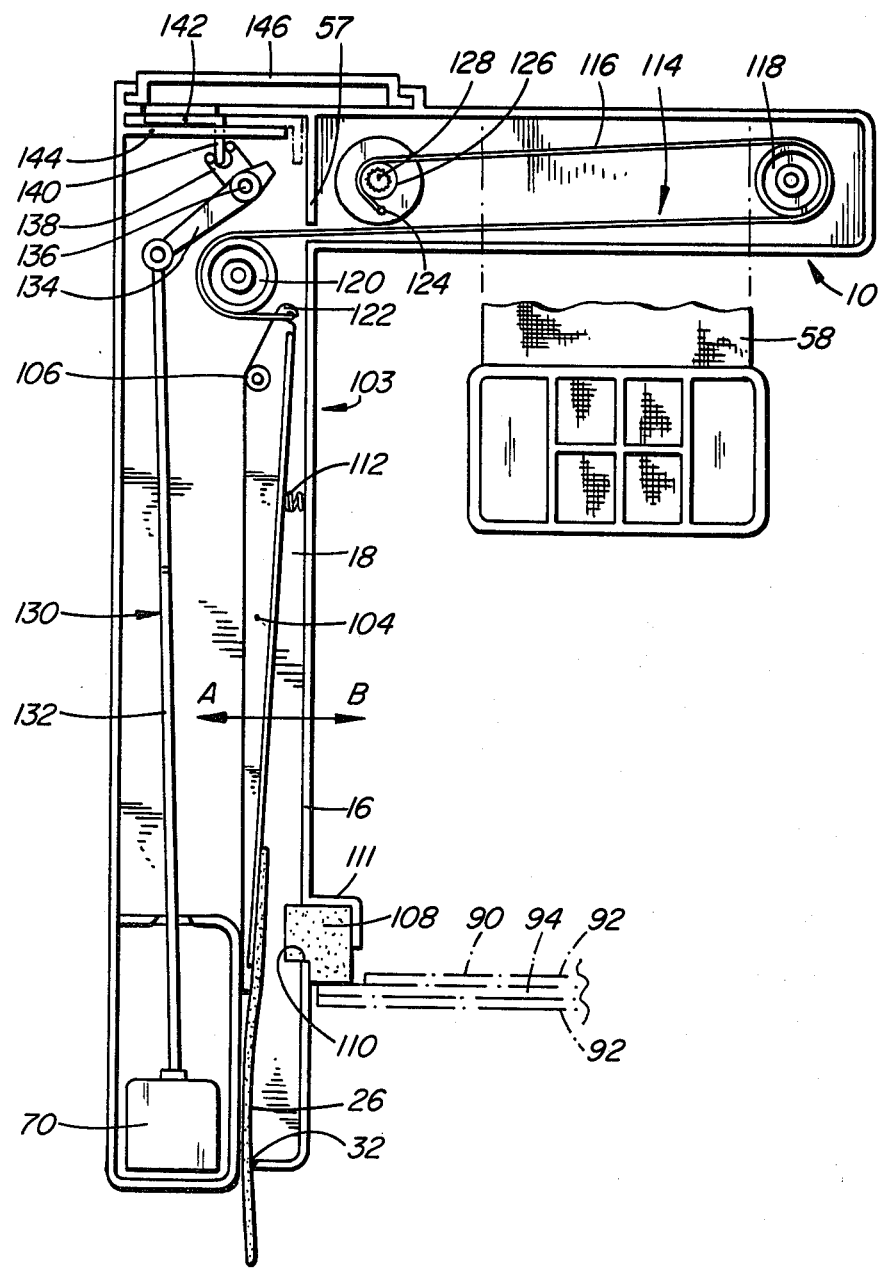
FIG. 5 is a view similar to FIG. 1 of apparatus according to a second embodiment.

In a second embodiment shown in FIG. 5 and giving the same advantages as the first embodiment, an apparatus 103 for controlling moisture content, has a housing 10 and other parts similar to ones described in the first embodiments. Similar parts will carry the same reference numerals as in the first embodiment and only differently operating parts will be described.

In the second embodiment, a moisture feed and interruption device comprises a lever 104 pivotally mounted upon a pin 106 integral with the housing side wall 18 at a position intermediate ends of the lever. A lower end portion of the lever carries a first fabric 26 which extends through opening 32 as in the first embodiment. A second fabric 108 is a felt or other absorbent block and this is retained projecting through a second opening 110 in one side 16 of housing part 12 by an inverted L-shaped retaining wall 111 of the housing.

A biassing means to urge the lever away from the second fabric comprises a compression spring 112 held between the lever and a side 16 of housing part 12 at a position beneath the pin 106.

A moisture detection and moisture control means 114 comprises a woven ribbon 116 extending in two flights around a roller 118 in the transverse housing part. The lower flight extends through the partition 57 and around another roller 120 to be attached to a hook 122 at the upper end of the lever 104, i.e. above pivot pin 106. The spring 112 tends to urge the lever in direction 'A', therefore, and the ribbon urges the lever in direction 'B' as the ribbon shrinks during drying. The position of the fabric 58 is shown, as in FIG. 1, although it is to be understood that the fabric is not present with the housing cover plate removed in FIG. 5.

Anchorage means in the second embodiment comprises a pin 124 to which the upper flight of the ribbon 116 is attached. This pin is integral with or mounted upon a roller 126 around which the ribbon extends. For adjustment of the anchoring position, the roller 126 may have a splined hole by which it is received upon a complementary splined shaft 128 as shown. Adjustment is made by removing the roller and turning it slightly in either direction to replace it upon the shaft in a different angular position.

A water level indicator 130 has float 70, as in the first embodiment. In the second embodiment however, a spindle 132 is secured at one end to the top of the float and is pivotally connected by its other end to one end of a bell crank lever 134, pivotally mounted by pin 136 to the side wall 18. The other end of lever 134 is bifurcated as at 138 and this end straddles a leg 140 of a slide 142 which is slidable upon a flat plate 144 beneath a sight glass 146. The upper surface of the slide 142 acts as a sight gauge, the position of which is dictated by the vertical position of the float and thus by the water level in the reservoir.

The apparatus of the second embodiment operates in a manner similar to that of the first embodiment and the position of the lever 104 is controlled by the oppositely acting, stretching or shrinking ribbon 116 and the spring 112, to move the first fabric 26 into and out of contact with the second fabric 108, to feed or interrupt the feed of moisture into the soil support. In this embodiment, because the fabric 108 opens downwardly from the L-shaped wall 111, the apparatus needs to be positioned in a plant container with the fabric 108 contacting the upper surface of the soil support 90 as shown in chain-dotted outline in FIG. 5.

What is claimed is:

1. Apparatus for controlling moisture content in soil in a plant container comprising:

a housing having a lower region defining a first opening and a side defining a second opening located upwardly from the first opening;

a moisture feed and feed interruption device comprising a lever pivotally mounted at a pivotal position within the housing and depending from the pivotal position towards the lower region to enable a first water absorbent fabric carried by the lever to extend through the first opening and project from the housing, the lever being pivotally movable to move part of the first fabric into and out of contact with a second water absorbent fabric to transfer water from the first fabric to the second fabric and through the second opening to the outside of the housing, the lever having a biassing means to pivotally urge the lever in one direction to move the first fabric out of contact with the second fabric; and a moisture detection and moisture control means comprising:

(a) a moisture-responsive, stretchable and shrinkable material which stretches when in contact with moisture and shrinks during drying, the material contained within the housing and extending between one location at which it is anchored and another location at which it coacts with the lever to pivot the lever in the other direction and against the urgency of the biassing means and thus move the first fabric into contact with the second fabric as the material shrinks;

(b) a moisture-transfer absorbent fabric having a first part open to the interior of the housing in the vicinity of the material and a second part depending from said first part and from the housing, to transfer moisture upwardly to said first part and into the housing in the vicinity of the material.

2. Apparatus acording to claim 1, wherein the housing comprises a vertical part and a transverse part extending outwardly from an upper region of the vertical part, and the lever being located within the vertical housing part which has the lower region of the housing formed with the first opening and the side defining the second opening, the transverse housing part containing the stretchable and shrinkable material and with the moisture transfer fabric open to the interior of and depending from the transverse housing part.

3. Apparatus according to claim 2, provided with a partition within the housing which substantially separates the interior of the transverse housing part from the vertical housing part while defining a gap sufficient for the stretchable and shrinkable material to coact with the lever.

4. Apparatus according to claim 1, wherein the biassing means comprises a compression spring acting against the lever.

5. Apparatus according to claim 1, wherein the biassing means is a leaf spring.

6. Apparatus according to claim 5, wherein the leaf spring is integral with the lever.

7. Apparatus acording to claim 1, wherein the biassing means and the stretchable and shrinkable material both act upon the lever at positions beneath the pivotal position of the lever.

8. Apparatus acording to claim 1, wherein the pivotal position of the lever is intermediate its ends, the biassing means acts upon the lever at a position beneath the pivotal position and the stretchable and shrinkable material acts upon the lever at a position above the pivotal position.

9. Apparatus according to either claim 1 or claim 2, wherein the second fabric faces into the housing through the second opening, the housing has an abutment for the second fabric, said part of the first fabric is secured to the lever, and the first and second fabrics are pressed between the lever and the abutment when the first fabric is held in contact with the second fabric.

10. Apparatus according to claim 1, wherein the material extends laterally from the lever to form a first flight and around a return member and across the first flight to form a second flight, the second flight extending to its one location at which it is anchored.

11. Apparatus according to claim 10, wherein the return member is a roll which is freely rotatable within the housing.

12. Apparatus according to claim 10, provided with an anchorage means for the material, the anchorage means being adjustable in position to alter tension on the material.

13. Apparatus according to claim 12, wherein said anchorage means comprises a screw-threaded adjustment to move it relative to the housing.

14. Apparatus according to claim 12, wherein the anchorage means is provided upon a splined roll which is received upon a complementarily splined shaft and is angularly adjustable upon the shaft to adjust the position of the anchorage means.

15. Apparatus according to either claim 1 or claim 2, wherein the transfer fabric extends upwardly into the housing and across the path of said material.

16. Apparatus according to claim 10, wherein the transfer fabric extends upwardly within the housing and across both flights of said material.

17. Apparatus according to claim 1, wherein the housing is formed with holes connecting its interior in the vicinity of the material with ambient atmosphere to enable the transfer fabric and the stretchable and shrinkable material to dry.

18. Apparatus according to claim 1, wherein said second part of the transfer fabric is provided with a relatively heavy element attached to the fabric to maintain it in a hanging position.

19. Apparatus according to claim 1, provided with a water level indicator.

20. Apparatus according to claim 19, wherein the level indicator comprises a visually readable gauge at the upper region of the housing, a float at the lower region of the housing and movable vertically in the lower region dependent upon level of water in that region, and an operating means interconnecting the float to the gauge to position the gauge in locations corresponding to vertical locations of the float.

21. A plant container with a base and an open top comprising a water distributing soil support comprising a fabric support structure carrying a water-absorbent, water distribution fabric, the structure and fabric disposed in a substantially horizontal position within the container and spaced above the base and below the open top to carry soil upon the support while separating the soil from a reservoir for water located beneath the support; and apparatus for controlling moisture content in the soil, said apparatus comprising:

(i) a housing extending downwardly through the container, through an opening in the support, and the housing having a lower region disposed within the reservoir;

(ii) a moisture feed and feed interruption device comprising a lever pivotally mounted at a pivotal position within the housing and depending from the pivotal position towards the lower region, a first water absorbent fabric carried by and extending from the lever, through a first opening in the housing to a position below a desired water level in the reservoir, a second water absorbent fabric extending outwardly through a second opening in the housing, in a position above the desired upper water level in the reservoir and in permanent water-transferring contact with the distribution fabric, the lever being pivotally movable to move part of the first fabric into and out of contact with the second water absorbent fabric to transfer water from the first fabric and into the distribution fabric, the lever having a biassing means to pivotally urge the lever in one direction to move the first fabric out of contact with the second fabric; and (iii) a moisture detection and moisture control means comprising:

(a) a moisture-responsive, stretchable and shrinkable material which stretches when in contact with moisture and shrinks during drying, the material contained within the housing and extending between one location at which it is anchored and another location at which it coacts with the lever to pivot the lever against the urgency of the biassing means and thus moves the first fabric into contact with the second fabric as the material shrinks; and (b) a moisture-transfer absorbent fabric having a first part open to the interior of the housing in the vicinity of the material and a second part depending from the housing to a position beneath the desired upper level of the soil to transfer moisture upwardly to said first part and into the housing in the vicinity of the material.

22. A plant container according to claim 21 wherein the housing of the moisture control apparatus comprises a vertical part containing the lever and extending downwardly through the container, and a transverse part extending outwardly from an upper region of the vertical part and over the upper level of the soil with the transverse part containing the stretchable and shrinkable material and with the moisture transfer fabric open to the interior of and depending from the transverse housing part.

* * * * *